Dec. 26, 1967  H. A. PRELLER  3,359,797
APPARATUS FOR RECORDING AN INTEGRATED RECORD OF GAS FLOW
Filed Sept. 30, 1964  2 Sheets-Sheet 1

HUGH A. PRELLER
INVENTOR.

BY

Robert K. Rhea
AGENT

Dec. 26, 1967  H. A. PRELLER  3,359,797
APPARATUS FOR RECORDING AN INTEGRATED RECORD OF GAS FLOW
Filed Sept. 30, 1964  2 Sheets-Sheet 2

HUGH A. PRELLER
*INVENTOR.*

BY

Robert K. Rhea
AGENT

United States Patent Office 3,359,797
Patented Dec. 26, 1967

3,359,797
APPARATUS FOR RECORDING AN INTEGRATED RECORD OF GAS FLOW
Hugh A. Preller, 1210 NW. 18th,
Oklahoma City, Okla. 73106
Filed Sept. 30, 1964, Ser. No. 400,426
6 Claims. (Cl. 73—204)

ABSTRACT OF THE DISCLOSURE

A pair of balanced thermistors are positioned within a gas line on the respective sides of an orifice therein. A gear equipped balancing motor is mounted on a pair of slide rails for movement to and fro therealong. A differential voltage potential sensing and amplifying circuit connects the thermistors to the balancing motor. A synchronous motor, mounted on the balancing motor, drives a chart recording apparatus through a variable speed means wherein the position of the balancing and synchronous motors along the slide rails determines the speed ratio of the variable speed means.

---

The present invention relates to recorders and more particularly to a rate of gas flow recording apparatus.

It is common practice in recording the rate of gas flow to use a recording device having a stylus which scribes one or more lines on a circular chart indicating gas pressure or rate of flow by means of a chart revolving clock. The path of the stylus on the chart is governed by a gas pressure and a temperature sensing means connected to the gas line on opposite sides of an orifice in the gas line. The pressure sensing means is usually a diaphragm, bellows or mercury. Some of the disadvantages of the presently used pressure and temperature recording instruments are: Mercury is relatively expensive, difficult to retain in the instrument and is frequently stolen; and the chart is not always replaced at the identical time each day and the gas pressure and temperature record scribed on a circular chart must be integrated to indicate the volume of gas passing through the orifice at the standardized 60° F. temperature for gas sales.

The principal object of the present invention is to provide a gas pressure sensing means for recording an integrated gas flow record on a chart.

Another object is to provide a device which records variations in gas pressure and gas flow through a pipe line on a moving chart wherein the movement of the chart is accelerated or reduced in response to the rate of flow of gas through an orifice.

Still another object is to provide a device of this class which progressively moves a linear chart in contact with a stylus.

Still another object is to provide an electrical circuit connected with pressure sensing means installed in the gas line which is in turn connected with a balancing motor to move the latter and increase or decrease the rate of travel of the recording chart in response to variations in the gas pressure and thus produce an integrated gas flow record.

The present invention accomplishes these and other objects by positioning a pair of thermistors within a gas line on opposite sides of an orifice in the gas line and connecting the thermistors to a balancing motor by a current amplifying circuit while a timing motor, mounted on the balancing motor, drives a chart through a variable speed means connected with the timing motor.

Figures 1, 4:
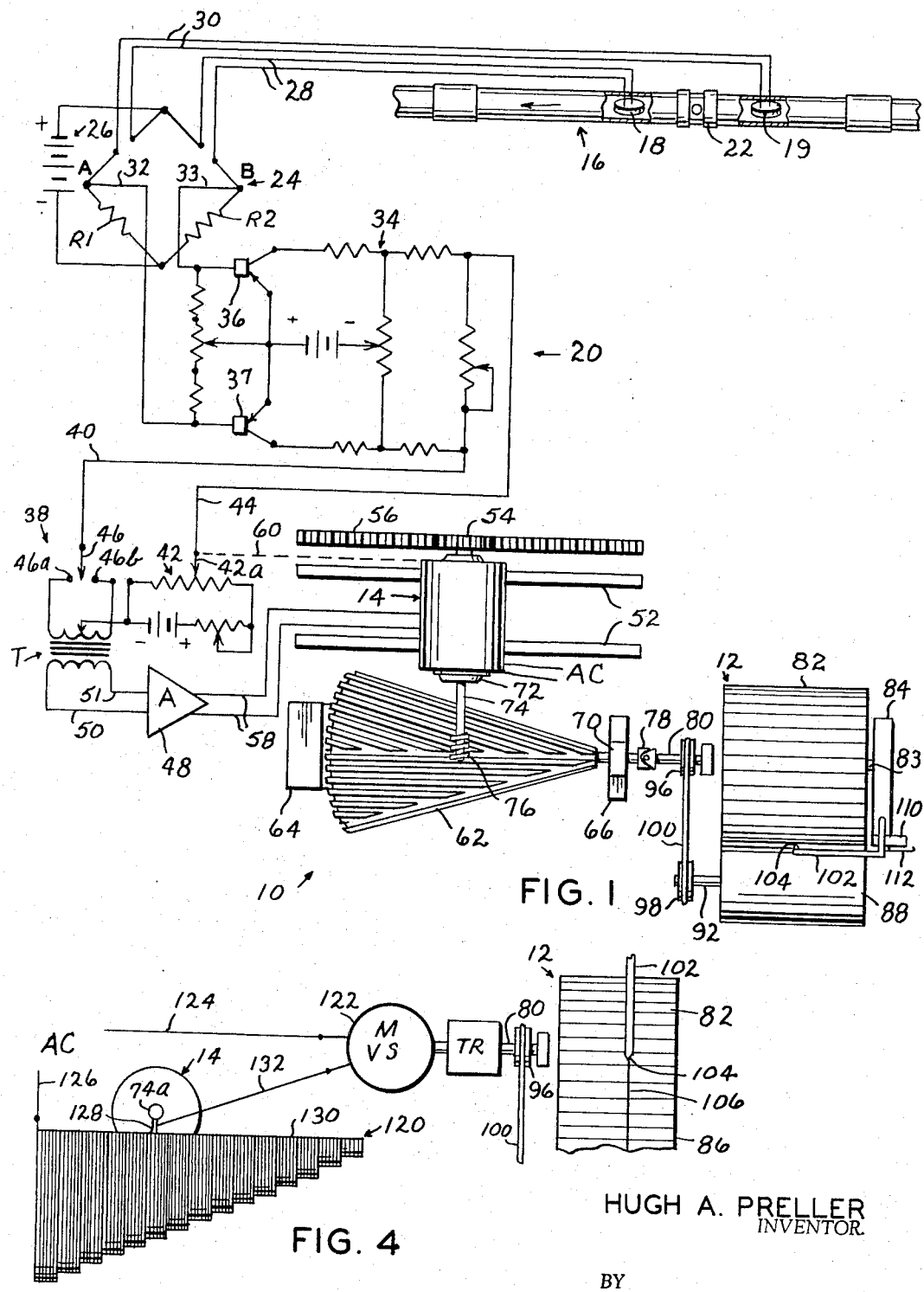
Figure 2:
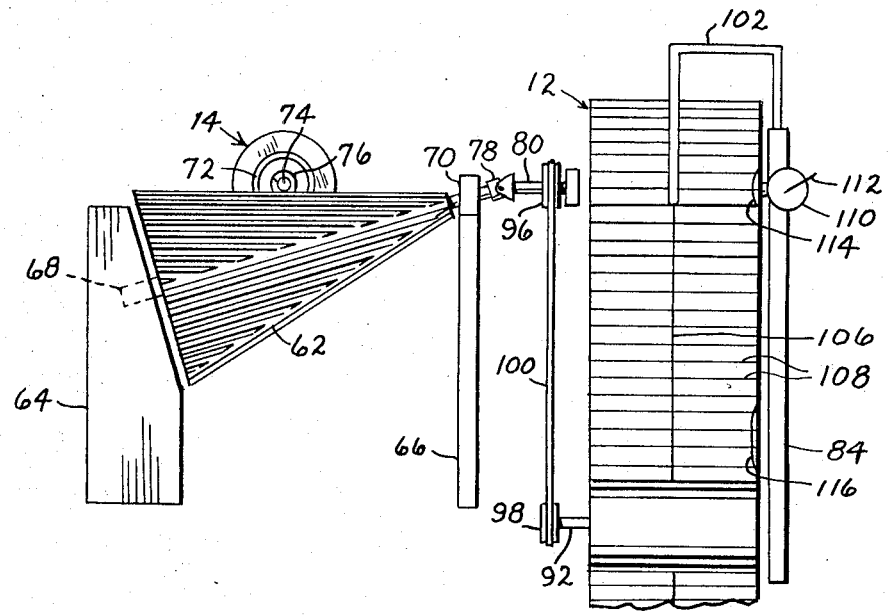
Figure 3:
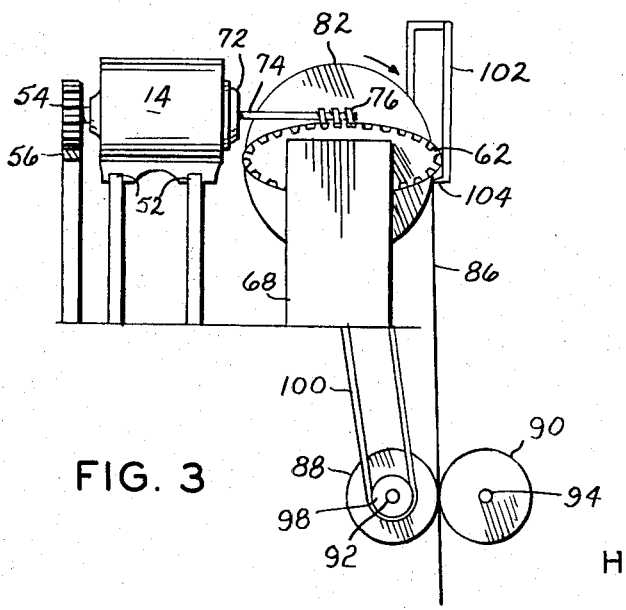

Other objects will be apparent from the following description when taken in conjunction with the accompanying two sheets of drawings, wherein:

FIGURE 1 is a diagrammatic view of the components of the device and electrical wiring;
FIGURE 2 is an elevational view of the chart rotating means of FIG. 1;
FIGURE 3 is a left side elevational view of FIG. 2; and,
FIGURE 4 is an alternative variable speed means.

Like characters of reference designate like parts in those figures of the drawings in which they occur.

In the drawings:

The reference numeral 10 indicates the device, as a whole, comprising a chart holding and advancing means 12, a two-phase balancing motor 14, connected with the chart holding means, and a pair of balanced thermistors 18 and 19 interconnected with the balancing motor 14 by an electrical amplifying circuit indicated generally at 20. A gas line 16, conveying gas in the direction of the arrow, is provided with an orifice 22. The balanced thermistors 18 and 19 are positioned within the gas line on opposing sides of the orifice. A Wheatstone type bridge 24, containing a pair of matched resistances R1 and R2, is connected with a battery 26. The thermistor 18, positioned on the down flow side of the orifice 22, is connected by wires 28 to the bridge on that side opposite the resistance R1. The thermistor 19 is connected by wires 30 to that side of the bridge opposite the resistance R2. The thermistors 18 and 19 thus form resistances in the bridge 24 opposite the resistances R1 and R2, respectively, which would normally balance the bridge. The ambient temperature is equal and balanced but the gas temperature surrounding the thermistor 19 will be higher than the temperature of the gas around the thermistor 18. This results in a difference in voltage to be impressed on the bridge 24 and results in a potential difference between the terminals A and B of the bridge. These terminals A and B are connected by wires 32 and 33, respectively, to a direct current balanced transistor amplifier, indicated at 34, including a pair of matched transistors 36 and 37, a small battery and resistors of selected value, not numbered. This amplifier is sensitive enough to permit the measurement of a weak direct current such as the output of a thermocouple. Temperature effects are balanced out because the transistors are affected equally and opposite. One output terminal of the signal amplifier 34 is connected to a synchronous converter 38 by a wire 40 while the other output terminal is connected with a measuring slidewire 42 by a wire 44.

The converter 38 has a variable arm 46 associated with contacts 46a and 46b connected, in turn, with the primary side of a transformer T. The secondary side of the transformer T is connected to an amplifier 48 by wires 50 and 51. Any deviation from initial balance over the input wires 40 and 44 is detected by the amplifier 48. This unbalance potential causes a current to flow through the synchronous converter when contacts 46a and 46b alternately reverse the direction of current through the center tapped primary of the transformer T. This induces an alternating current voltage through the secondary of the transformer T, which is amplified by the amplifier 48 to energize the control winding of the balancing motor 14 by wires 58.

The balancing motor 14 is mounted on a pair of slides or guides 52. One end of the armature shaft of the motor 14 is axially connected to a spur gear 54 which meshes with a rack 56. The field winding, not shown, of the motor 14 is connected to a source of electrical energy AC. The motor 14 is connected with the slidewire contact 42a, as indicated by the dotted line 60.

A conical shaped gear 62 is mounted on an incline between a pair of upright supports 64 and 66 by bearings 68 and 70 so that a side surface of the gear 62 is positioned horizontally. A synchronous timing motor 72 is mounted on the balancing motor 14 opposite the spur gear 54. The timing motor 72 includes a shaft 74 having a worm gear 76 contacting the teeth of the gear 62. The gear 62 is connected by a universal joint 78 to a horizontal drive shaft 80 which drives the chart holding and moving means 12.

The chart holding means 12 comprises a roll of chart paper 82 axially mounted on a shaft 83 adjacent the shaft 80 and supported at one end by an upright support 84. The free end portion 86 of the chart projects downwardly from the chart roll 82 and is interposed between a driven roller 88 and an idling roller 90. The rollers 88 and 90 are each provided with an axle 92 and 94, respectively, journaled at their respective ends by bearings, not shown.

Pulleys 96 and 98 are connected, respectively, to the shaft 80 and axle 92 for receiving a belt 100 so that rotation of the shaft 80 revolves the roller 88 and maintains a tension on the free end portion 86 of the chart. A scriber 102 is supported by the support 84 and includes a line scribing pen 104 in contact with the periphery of the chart 82. Thus, movement of the chart 82 under the pen 104, as described hereinabove, forms a line 106 on the chart as the chart is progressively advanced.

Obviously a marginal edge perforated chart may be used with cooperating teeth on the roller 88, if desired.

The chart is calibrated by transverse lines 108 to indicate gas measurements in any desired volume. In recording gas measurement it is necessary that the passage of time be recorded on the chart to determine the volume of gas used or passing through the orifice 22 in a given period of time. This is accomplished by mounting an independently driven synchronous motor 110 on the support 84 wherein the shaft of the motor is provided with an hour hand 112, for example, having a scriber pen on its free tip end so that when the motor 110 revolves the hand 112 the scriber forms a line 114 on the chart. The position of the line 114, at its point of scribed contact on the chart with respect to a similar line 116 formed earlier on the chart, indicates an elapsed time of one hour. Obviously other periods of time could be indicated in a similar manner.

Another manner of imparting variable speed to the chart holding and advancing means 12 is illustrated in FIG. 4 wherein a stair-step type coil 120 replaces the gear 62. A variable speed motor 122 is connected to the shaft 80 through a transmission TR. The coil 120 and variable speed motor 122 are connected to a source of alternating current AC, not shown, by wires 124 and 126. A slide contact 128, secured to the balancing motor 14 by a shaft 74a, is moved in slidewire contact fashion along the surface 130 of the coil 120. The slidewire contact 128 is connected by a wire 132 to the variable speed motor 122 so that as the balancing motor 14 is progressively moved in its respective direction or maintained stationary by the balanced current, as disclosed hereinabove, the speed of the variable speed motor remains constant or is increased or decreased in accordance with the resistance to the circuit by the position of the slide contact 128 on the coil. Thus the rate of movement of the chart is varied in direct proportion to the speed of the variable speed motor 122.

Operation

In operation pressure differential sensed by the thermistors 18 and 19 is impressed on the bridge 24 and results in a difference in voltage between the bridge terminals A and B. This potential is multiplied by the amplifier 34 and converted to alternating current through the converter 38 and transformer T. The alternating current from the secondary side of the transformer T is amplified by the amplifier 48 which energizes the control winding of the balancing motor 14 to rotate the spur gear 54 and move the motor 14 along its slide rails 52 until the motor 14, moving the slidewire contact 42a, achieves a balance of the current values which stops the motor 14. Movement of the motor 14, in its respective direction of movement, increases or decreases the rate of rotation of the chart driving shaft 80. The system remains in balanced position with the chart 82 moving at constant speed until such time as a pressure differential, sensed by the thermistors 18 and 19, again generates a signal for moving the motor 14 in the same or opposite direction.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A rate of gas flow sensing means adapted to be connected with a gas conveying line for measuring the volume of gas passing through an orifice in the gas line, comprising: a pair of balanced thermistors positioned in said gas line on opposite sides of said orifice; a pair of slide rails; a two-phase balancing motor mounted on said slide rails for movement along said rails in opposing directions, said balancing motor having a control winding; a spur gear connected with the armature of said balancing motor; a rack meshing with said spur gear; a chart holding and advancing means; a chart mounted on the chart holding and advancing means; a stylus in contact with said chart; a synchronous motor mounted on said balancing motor; a variable speed means interconnecting said synchronous motor with said chart holding and advancing means for varying the rate of advancement of the latter; and a differential voltage potential sensing circuit and amplifying means connecting said thermistors with the control winding of said balancing motor for energizing the latter in response to gas flow through said orifice, whereby the position of said balancing and synchronous motors on said slide rails determines the speed ratio of said variable speed means.

2. Structure as specified in claim 1 in which said differential voltage potential sensing circuit and amplifying means includes a slidewire contact; and control means connecting said balancing motor to said slidewire contact for balancing the current through said differential voltage potential sensing circuit and amplifying means.

3. A gas flow recording apparatus adapted to be connected with a gas conveying line having an orifice therein, comprising: a pair of balanced thermistors positioned within said gas line on the respective sides of said orifice; a gas flow rolled record chart; a stylus contacting said chart and scribing a line thereon as the chart is advanced; chart holding and advancing means including a pair of juxtaposed rollers gripping opposing surfaces of a free end portion of said rolled record cart; means for rotating at least one of said rollers including a pair of slide rails, a balancing motor mounted on said slide rails, a synchronous motor mounted on said balancing motor, a drive shaft, variable speed means interconnecting said synchronous motor with said drive shaft, and belt and pulley means interconnecting said drive shaft to one of said rollers for moving said chart between said rollers; and a differential voltage potential sensing and amplifying circuit interconnecting said thermistors with said balancing motor for operating and moving the latter along said slide rails, whereby the position of said balancing and synchronous motors on said slide rails determines the speed ratio of said variable speed means and the rate of travel of said chart beneath said stylus in direct response to any increase or decrease in the rate of gas flow through said orifice.

4. Structure as specified in claim 3 in which said differential voltage potential sensing circuit includes a slidewire contact; control means interconnecting said balancing motor with said slidewire contact to stop the movement of said balancing motor along said slide rails when the current is balanced; and in which said variable speed means comprises meshing gears connected respectively with said synchronous motor and said drive shaft.

5. Structure as specified in claim 3 in which said variable speed means comprises: a coil; a variable speed motor; transmission means connecting said variable speed motor with said drive shaft; a contact secured to said balancing motor and slidably contacting said coil; wiring connecting said variable speed motor to a source of electrical energy through said contact and said coil whereby movement of said balancing motor along said slide rails varies the potential of the electrical energy supplied to said variable speed motor.

6. A gas flow recording apparatus adapted to be connected with a gas conveying line having an orifice therein, comprising: a pair of balanced thermistors positioned within said gas line on opposing sides of said orifice; a differential voltage potential sensing circuit connected with said thermistors; a current amplifying circuit connected with said sensing circuit; a two-phase balancing motor connected with said amplifying circuit; slide rails supporting said balancing motor for movement in opposing directions; gears connected with and operated by said balancing motor for moving the latter when the motor is energized by said amplifying circuit; a chart holding and advancing means; a synchronous motor mounted on said balancing motor; variable speed means interconnecting said synchronous motor with said chart holding and advancing means; and a stylus contacting said chart, whereby the position of said balancing and synchronous motors on said slide rails determines the speed ratio of said variable speed means.

References Cited
UNITED STATES PATENTS 3,147,618  9/1964  Benson _____ 73—204

RICHARD C. QUEISSER, *Primary Examiner.*

JAMES J. GILL, *Examiner.*

E. SCOTT, *Assistant Examiner.*